United States Patent [19]

Furuta

[11] 4,435,735
[45] Mar. 6, 1984

[54] MAGNETIC RECORDING-REPRODUCING APPARATUS WITH CONSTANT LENGTH CUE SIGNAL

[75] Inventor: Kenji Furuta, Hachioji, Japan

[73] Assignee: Olympus Optical Co., Ltd., Tokyo, Japan

[21] Appl. No.: 348,187

[22] Filed: Feb. 12, 1982

Related U.S. Application Data

[63] Continuation-in-part of Ser. No. 171,533, Jul. 23, 1980, abandoned.

[30] Foreign Application Priority Data

Aug. 1, 1979 [JP] Japan .............................. 54-106677

[51] Int. Cl.³ ...................... G11B 15/52; G11B 27/28
[52] U.S. Cl. .................................. 360/74.4; 360/72.1
[58] Field of Search ...................... 360/74.4, 72.2, 73, 360/71, 72.1, 74.1

[56] References Cited

U.S. PATENT DOCUMENTS

| | | | |
|---|---|---|---|
| 2,782,262 | 2/1957 | Hammond, Jr. et al. | 360/74.4 |
| 3,423,743 | 1/1969 | Silverman | 360/72.1 |
| 3,594,729 | 7/1971 | Uemura | 360/72.1 |
| 3,852,814 | 12/1974 | Johnson et al. | 360/72.1 |
| 4,000,518 | 12/1976 | Stearns | 360/74.4 |
| 4,237,498 | 12/1980 | Van Eljck et al. | 360/72.2 |

FOREIGN PATENT DOCUMENTS

| | | | |
|---|---|---|---|
| 52-12818 | 1/1977 | Japan | 360/74.4 |
| 55-22253 | 2/1980 | Japan | 360/72.1 |

*Primary Examiner*—Stuart N. Hecker

[57] ABSTRACT

A magnetic recording-reproducing apparatus in which one of the speeds at which a magnetic tape is made to run during the recording or reproducing mode is selectively preset. During the recording mode, a cue signal having a lower frequency than a recorded sound signal is recorded on a magnetic tape together with a desired sound signal. During the fast forward or rewind mode, the cue signal is detected, thereby making it possible to indicate the desired sound signal. This cue signal has a frequency proportionate to the speed at which the magnetic tape is made to run during the recording mode, and is recorded on the magnetic tape for a length of time inversely proportionate to the running speed of the magnetic tape.

4 Claims, 11 Drawing Figures

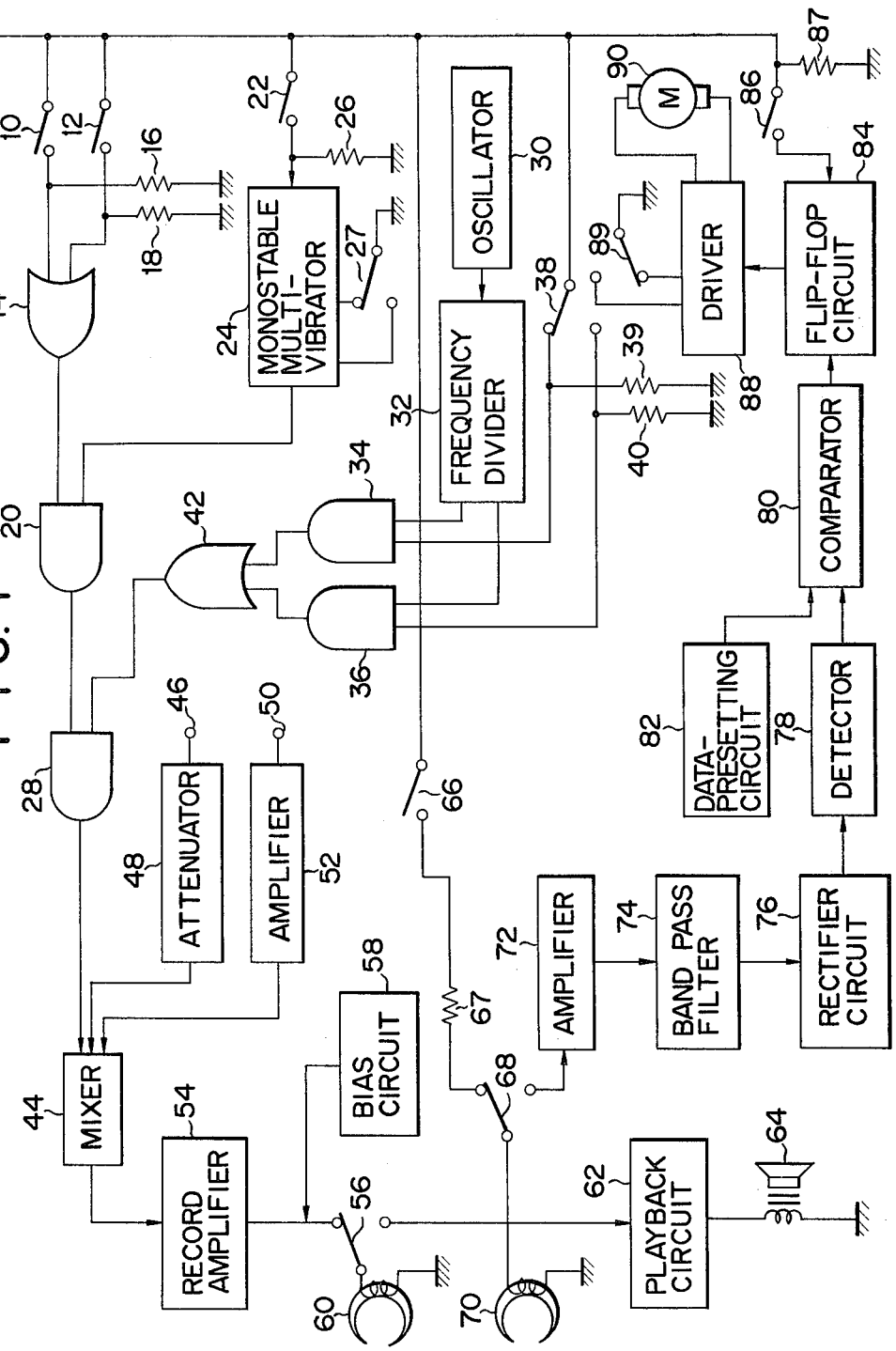
F I G. 1

MAGNETIC RECORDING-REPRODUCING APPARATUS WITH CONSTANT LENGTH CUE SIGNAL

CROSS-REFERENCE TO RELATED APPLICATION

This application is a continuation-in-part of our copending application, Ser. No. 171,533, filed July 23, 1980, now abandoned and assigned to the same assignee as that of the parent application.

BACKGROUND OF THE INVENTION

This invention relates to an apparatus for recording and reproducing sound signals using a magnetic tape, and more particularly to a magnetic recording-reproducing apparatus capable of detecting that position of a magnetic tape in which a desired sound signal is recorded.

Hitherto, the recording of sound signals such as music, voices, etc., on a magnetic tape comprises the step of recording a cue signal having a prescribed far lower frequency of only scores of Hertz than sound signals in a state superposed on a particular sound signal for a prescribed length of time. During the reproduction mode, the cue signal having too low a frequency is not detected. Where, however, a magnetic tape is made to run at a high speed, for example, during the fast forward or rewind mode, the cue signal is detected due to its frequency being increased. Namely, at the high speed run of the magnetic tape, the cue signal acts as an indicator of a desired recorded signal.

The frequency of the cue signal during the fast forward or rewind mode is determined by the ratio between the tape speed during the fast forward or rewind mode and that during the recording mode. On the other hand, it should be noted that the tape speed during the recording mode should preferably be changed to any of a few levels, with regard to the kind of a recorded signal or the extent to which the magnetic tape is made to run in order to record a desired signal. If, therefore, the frequency of the cue signal to be recorded is made to have a prescribed frequency, then the frequency of a cue signal reproduced during the fast forward or rewind mode is changed, in case the tape speed varies during the recording mode and some times is thrown outside of the frequency band of the reproduction circuit. If, however, the reproduction circuit is made to have a broadened frequency hand in order to resolve the above-mentioned difficulty, then the cue signal is likely to be erroneously detected by noise signals. Further where a cue signal is recorded for a prescribed period, then the length of the tape at which the cue signal is recorded will vary, in case the tape speed during the recording mode varies. This event presents difficulties in distinguishing between different types of cue signals when they are recorded on the same tape. Further in case a signal cue signal is applied, a difference in its reproduction time will obstruct the accurate detection of the cue signal.

SUMMARY OF THE INVENTION

It is accordingly the object of this invention to provide a magnetic recording-reproducing apparatus capable of accurately detecting the recorded position of particular sound signals when a magnetic tape is scanned at a higher speed than that at which the sound signals are reproduced.

To attain the above-mentioned object, this invention provides a magnetic recording-reproducing apparatus which comprises a tape driving section which, during the recording or reproduction mode, causes a magnetic tape to run at one of a plurality of travelling speeds, and, during the fast forward or rewind mode causes the tape to run at a higher speed than that at which the tape is made to run during the recording or reproduction mode, a circuit for recording on a magnetic tape a signal having a frequency proportionate to the tape speed during the recording mode in a state superposed on sound signals for a length of time inversely proportionate to the tape speed during the recording mode, and a circuit for reproducing signals recorded on the magnetic tape during the fast forward or rewind mode.

BRIEF DESCRIPTION OF THE DRAWING

FIG. 1 is a block diagram of a magnetic recording-reproducing apparatus according to a first embodiment of this invention;

DETAILED DESCRIPTION OF THE PREFERRED EMBODIMENTS

Figure 2:
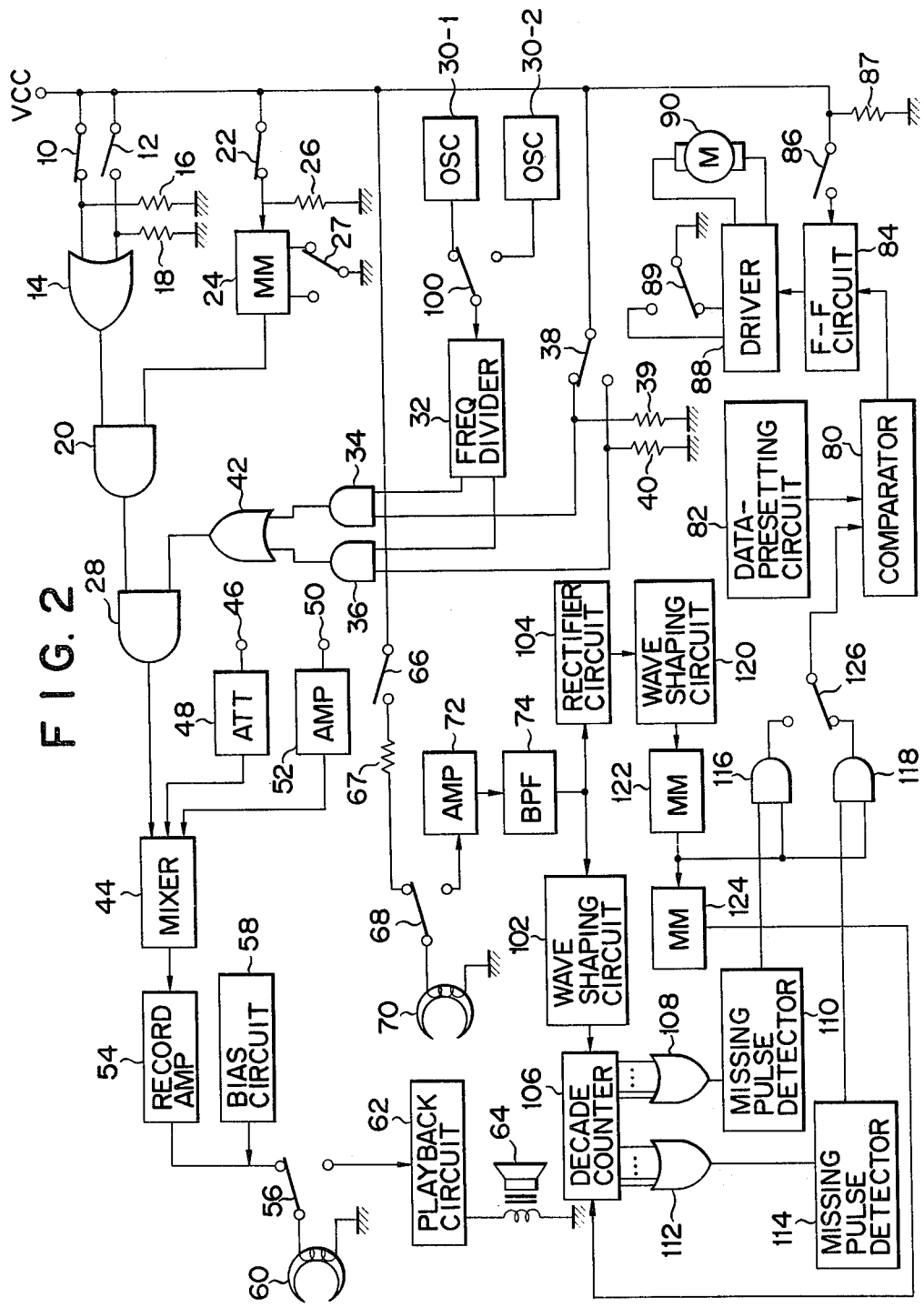
FIG. 2 is a block diagram of a magnetic recording-reproducing apparatus according to a second embodiment of the invention.

Referring to the accompanying drawing, a power supply terminal Vcc is connected to the input terminal of an OR gate 14 through a record switch 10 and playback switch 12. A junction between the input terminal of the OR gate 14 and record switch 10 is grounded through a resistor 16. A junction between the input terminal of the OR gate 14 and playback switch 12 is similarly grounded through a resistor 18. The output terminal of the OR gate 14 is connected to one input terminal of an AND gate 20. The power supply terminal Vcc is connected to the input terminal of a monostable multivibrator 24 through a switch 22. A junction between the monostable multivibrator 24 and switch 22 is grounded through a resistor 26. The monostable multivibrator 24 has its time constant varied by a switch 27 in two stages of T, 2T. The output terminal of the monostable multivibrator 24 is connected to the other input terminal of the AND gate 20. The output terminal of the AND gate 20 is connected to one input terminal of an AND gate 28.

The output terminal of an oscillator 30 is connected to a frequency divider 32, which comprises a first output terminal for sending forth a signal having a frequency of 20 Hz and a second output terminal for issuing a signal having a frequency of 40 Hz. The first output terminal is connected to one input terminal of an AND gate 34, and the second output terminal is connected to one input terminal of an AND gate 36. The power supply terminal Vcc is connected to the stationary contact of a switch 38, whose first and second movable contacts are respectively connected to the other input terminals of the AND gates 34 and 36. The first and second movable contacts of the switch 38 are grounded through the corresponding resistors 39 and 40. The output terminals of the AND gates 34 and 36 connected to the corresponding input terminals of an OR gate 42. The output terminal of the OR gate 42 is connected to the other input terminal of the AND gate 28. The switch 38 is operated interlocking with the switch 27 and renders conductive either one of the AND gates 34 and 36. In other words, where the monostable multivibrator 24 is chosen to have a large time constant 2T, then the switch 38 is connected to the first movable contact for the conduction of the AND gate 34. As a result, a frequency-divided signal having a frequency of 20 Hz is delivered to the other input terminal of the AND gate 28. Conversely where the monostable multivibrator 24 is designed to have a small time constant T, then the switch 38 is connected to the second movable contact for the conduction of the AND gate 36, causing a frequency-divided signal having a frequency of 40 Hz to be supplied to the other input terminal of the AND gate 28, whose output terminal is connected to the first input terminal of a mixer 44. A line input terminal 46 for receiving a signal sent forth from a tuner (not shown) is connected to the second input terminal of the mixer 44 through an attenuator 48. A microphone terminal 50 for receiving an output signal delivered from a microphone (not shown) is connected to the third input terminal of the mixer 44 through an amplifier 52. The output terminal of the mixer 44 is connected to the first movable contact of a switch 56 through a record amplifier 54. The output terminal of a bias circuit 58 is also connected to the first movable contact of the switch 56. The stationary contact of the switch 56 is connected to a record-playback head 60. The second movable contact of the switch 56 is connected to a speaker 64 through a playback circuit 62. The switch 56 is interlockingly operated with the record switch 10. At this time, the stationary contact of the switch 56 is connected to the first movable contact, that is the record amplifier 54. The switch 56 is also interlockingly operated with the playback switch 12. At this time, the stationary contact of the switch 56 is connected to the second movable contact, that is, the playback circuit 62. The record-playback head 60 is brought into contact with a tape in the record or playback mode.

The power supply terminal Vcc is connected to the first movable contact of a switch 68 through a switch 66 and resistor 67. The switch 66 is closed in interlocking relationship with the record switch 10. The stationary contact of the switch 68 is connected to a position-detecting head 70. The second movable contact of the switch 68 is connected to one input terminal of a comparator 80 through an amplifier 72, band pass filter 74, rectifier circuit 76 and detector 78. This detector 78 includes a counter for counting a number of reproduced detection signals, and sends forth a signal denoting the counted number. A data-presetting circuit 82 is connected to the other input terminal of the comparator 80. The stationary contact of the switch 68 is connected to the first movable contact when the record switch 10 is closed. When the record switch 10 is opened, then the stationary contact of the switch 68 is connected to the second movable contact. When a tape runs, the position-detecting head 70 touches the tape before the record-playback head 60. This position-detecting head 70 is brought into contact with the tape in the recording mode and so-called cuing mode. In the record mode, the position-detecting head 70 acts as an erase head and in the so-called cuing mode, acts as a playback head due to the above-mentioned changed operation of the switch 68. The output terminal of the comparator 80 is connected to the input terminal of a flip-flop circuit 84. The power supply terminal Vcc is connected to the reset terminal of the flip-flop circuit 84 through a switch 86. This switch 86 is closed when a tape recorder commences its operation. A junction between the power supply terminal Vcc and switch 86 is grounded through a resistor 87. The output terminal of the flip-flop circuit 84 is connected to the control terminal of a driver 88. Where a H (high) level signal is supplied to the control terminal of the driver 88, then a motor 90 stops its rotation. A switch 89 for changing the number of rotations of the motor 90, thereby to vary a tape speed is connected to the driver 88. The aforesaid switches 27 and 38 are interlockingly operated with this tape speed-changing switch 89. Now let it be assumed that a tape can be made to ran interchangeably at a speed of 1.2 cm/sec or 2.4 cm/sec. Where the tape travels at a speed of 1.2 cm/sec, then the time constant of the monostable multivibrator 24 is set at 2T. Thus a frequency divided signal having a frequency of 20 Hz is supplied to the AND gate 28. Where the tape runs at a speed of 2.4 cm/sec, then the time constant of the monostable multivibrator 24 is set at T. Then a frequency-divided signal having a frequency of 40 Hz is conducted to the AND gate 28.

Description is now given of the operation of an apparatus embodying this invention which is constructed as described above to reproduce a desired detection signal recorded on a tape. Where the record switch 10 and consequently the switches 66 and 86 are closed, then the stationary contacts of the switches 56 and 68 are connected to the corresponding first movable contacts. At this time, the record-playback head 60 and position-detecting head 70 are brough into contact with a tape. Where the switch 86 is closed, then the flip-flop circuit 84 is reset. The driver 88 starts the rotation of the motor 90. Accordingly, the motor 90 is driven in a prescribed number of rotations to effect a tape run. A voice signal supplied from the line input terminal 46 or microphone terminal 50 is biased to be recorded on a magnetic tape. Now let it be assumed that a tape runs at a speed of 1.2 cm/sec. Where a desired voice signal is recorded, the switch 22 is closed, and the monostable multivibrator 24 is energized to send forth a pulse having a width corresponding to the time constant of 2T. As a result, the AND gate 20 is rendered conductive for a prescribed period of time 2T. One of the input terminals of the AND gate 28 is supplied with a high level signal for a prescribed period of time 2T from the AND gate 20. The other input terminal of the AND gate 28 is already supplied with a frequency-divided signal having a frequency of 20 Hz which has been sent forth from the frequency divider 32. Therefore, the 20 Hz signal is conducted to the mixer 44 through the AND data 28 for a prescribed period of time 2T. Where a tape runs at a speed of 2.4 cm/sec, then a 40 Hz signal is supplied to the mixer 44 for a length of time corresponding to the time constat T of the monostable multivibrator 24. Where the switch 22 is closed in the record mode, a signal having a low frequency corresponding to a tape speed in the record mode is superposed on a voice signal and recorded on a tape for a length of time corresponding to the tape speed. Where the tape runs at a higher speed of 2.4 cm/sec, then the record time is shortened. Therefore, that section of a tape in which the low frequency signal is recorded has a constant length, regardless of a tape speed.

Description is now given of the process by which the low frequency signal superposed on a voice signal is detected. This detection is carried out in the fast forward or rewind mode during which a tape runs at a high speed. At this time, the position-detecting head 70 is brought into contact with a tape. The stationary contact of the switch 68 is connected to the second movable contact, that is, the amplifier 72. In the fast forward or rewind mode, a tape runs at a speed of 36 to 72 cm/sec. Therefore, a signal reproduced by the position-detecting head 70 at this time has a frequency accelerated in accordance with the ratio between a tape speed in the fast forward or rewind mode and that in the record mode. In other words, a signal recorded on a tape when it runs at a speed of 1.2 cm/sec has its frequency accelerated in the fast forward or rewind mode to 30 to 60 times the frequency indicated in the record mode. A signal recorded on a tape when it runs at a speed of 2.4 cm/sec has its frequency accelerated in the fast forward or rewind mode to 15 to 30 times the frequency shown in the record mode. With the foregoing embodiment, a superposed signal having a low frequency corresponding to a tape speed in the record mode is recorded. In the fast forward or rewind mode, the recorded superposed signal has its frequency accelerated to 600 to 1,200 Hz, no matter whether the signal was recorded at a tape speed of 1.2 or 2.4 cm/sec. Even where, therefore, a tape speed vaires in the record mode, a reproduced signal has its frequency kept unchanged. This fact offers the advantages that the circuit arrangement of the recorded signal position-detecting apparatus of this invention can be simplified, and it is unnecessary to broaden the playback-enabling frequency band of the apparatus, thereby eliminating detection errors resulting from the intrusion of noises.

A frequency band to which a band pass filter 74 is rendered permeable is set at 600 to 1,200 Hz. Therefore, a voice signal whose frequency is prominently accelerated at the time of detection is shut off by the band pass filter 74.

Further advantages of the magnetic recording-reproducing apparatus of the invention are that the section of a tape in which a detection signal is recorded remains unchanged in length, regardless of a tape speed in the record mode, consequently detection can always be effected in a constant length of time, and the detection time is neither too short for full detection of a desired recorded signal, is too long, resulting in the possibility of an undesired signal being simultaneously reproduced.

A signal detected by the rectifier circuit 76 is supplied to the detector 78. Where coincidence takes place between a number of signals detected by the detector 78 and a number previously stored in the data presetting circuit 82, then the comparator 80 issues a coincidence signal, causing the flip-flop circuit 84 to be set. An output signal from the flip-flop circuit 84 which has been set has a high level, thereby stopping the rotation of the motor 90 by the driver 88. The provision of the data presetting circuit 82 is for the reason that where a plurality of low frequency detection signals are recorded in various places of a tape, it is desired to specify the position in which a prescribed detection signal is recorded.

Description is now given with reference to FIG. 2 of a magnetic recording-reproducing apparatus according to a second embodiment of this invention. The parts of FIG. 2 the same as those of the first embodiment of FIG. 1 are denoted by the same reference numerals, description thereof being omitted. In the second embodiment, two oscillators 30-1 and 30-2 are provided to act as cue signal generators. The output terminals of the oscillators 30-1 and 30-2 are respectively connected to the first and second movable contracts of a switch 100. The stationary contact of the switch 100 is connected to the input terminal of a frequency divider 32.

The oscillators 30-1 and 30-2 respectively send forth signals having frequencies of 80 and 160 Hz. An output signal from a band pass filter 74 for reproduction is supplied to a wave shaping circuit 102 and rectifier circuit 104. The output terminal of the wave shaping circuit 102 is connected to a clock input terminal of a decade counter 106. This decade counter 106 is constructed by connecting in series two IC units (MC 14017B) manufactured by MOTOROLA Company. Output signals representing 37 through 43 included in those from the decade counter 106 are delivered to a missing pulse detector 110 through an OR gate 108. Output signals representing 77 through 83 from the decade counter 106 are conducted to a missing pulse detector 114 through an OR gate 112. The output terminals of the missing pulse detectors 110 and 114 are respectively connected to the first input terminal of each of AND gates 116 and 118.

An output signal from the rectifier circuit 104 is supplied to a monostable multivibrator 122 through a wave shaping circuit 120. The output terminal of the monostable multivibrator 122 is connected to the input terminal of a monostable multivibrator 124 and the second input terminal of each of the AND gates 116 and 118. The output terminal of the monostable multivibrator 124 is connected to the reset terminal of the decade counter 106. The output terminals of the AND gates 116 and 118 are respectively connected to the first and second movable contacts of a switch 126, whose stationary contact is connected to the input terminal of a comparator 80.

Description is now given of the operation of a magnetic recording-reproducing apparatus according to the second embodiment. Frequencies of signals generated from the first and second output terminals of the frequency divider 32 (respectively connected to AND gates 34 and 36) are respectively divided into one-fourth and half of the original. Where the oscillator 30-1 is selected by the switch 100 and recording is carried out at a speed of 1.2 cm/s, then a cue signal having a frequency of 20 Hz is recorded of a period of 2T, and where recording is made at a speed of 2.4 cm/s, then a cue signal having a frequency of 40 Hz is recorded for a period of T, as in the first embodiment. With T taken to denote one second, a cue signal having 40 cycles/2.4 cm is recorded on a tape regardless of the tape speed. Where the oscillator 30-2 is selected by the switch 100, then the frequency divider 32 delivers signals having frequencies of 40 and 80 Hz respectively to the AND gates 34 and 36. Where, therefore, recording is made at a speed of 1.2 cm/s, then a cue signal of 40 Hz is recorded for 2 seconds. Where recording is made at a speed of 2.4 cm/s, then a cue signal of 80 Hz is recorded for one second. In this case, a cue signal of 80 cycles/2.4 cm is recorded on a tape regardless of the tape speed. As described above, the second embodiment enables the type of cue signal to be distinguished from the number of cycles of a signal recorded on the tape 2.4 cm long.

Figure 3A:
FIGS. 3A to 3I are time charts indicating the operation of the second embodiment.

A cue signal is detected during the fast forward or rewind mode. The selection of a cue signal to be detected can be effected by changing over the operation of the switch 126. Description is now given of the case where it is tried to detect a cue signal issued by the oscillator 30-2, that is, a cue signal recorded on 2.4 cm of the tape with 80 cycles. It is assumed that the operation of the switch 126 is changed over to select the AND gate 118 as indicated in FIG. 2. During the fast forward or rewind mode, the cue signal is filtered out from the band pass filter 74. The wave shaping circuit 102 converts the filtered cue signal into a pulse signal consisting of 80 pulses indicated in FIG. 3A. The rectifier circuit 120 rectifies an output signal from the band pass filter 74 and sends forth a signal indicated in FIG. 3B. Where the decade counter 106 sends forth two groups of signals as 37 through 43 and 77 through 83, then the OR gates 108 and 112 respectively issue pulse signal shown in FIGS. 3C and 3D. The output signals from the missing pulse detectors 110 and 114 rise when the input pulses supplied thereto rise and fall at the prescribed length of time after input pulses cease to be supplied. The missing pulse detectors 110 and 114 are formed of IC units for a timer SE555 manufactured by Texas Instruments Inc.

Figure 3B:
Figure 3C:
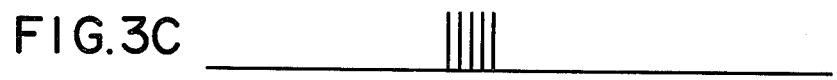
Figure 3D:
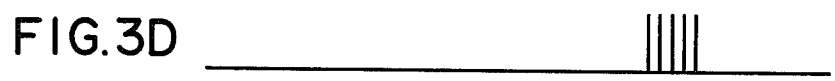
Figure 3E:
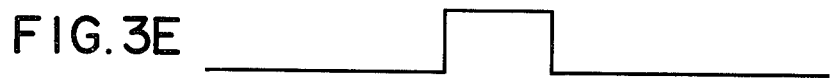
Figure 3F:
Figure 3G:
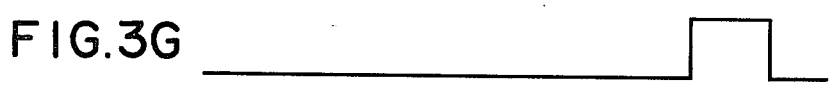
Figure 3H:
Figure 3I:

Output signals from the missing pulse detectors 110 and 114 have waveforms indicated in FIGS. 3E and 3F respectively. An output signal from the wave shaping circuit 120 of FIG. 3B is supplied to the monostable multivibrator 122. When, therefore, an input signal supplied to the monostable multivibrator 122 falls, a pulse signal having a prescribed time width shown in FIG. 3G is issued from the multivibrator 122. As a result, the AND gate 118 is conducted to supply a detection signal having a waveform indicated in FIG. 3H to the comparator 80 through the switch 126. In this case, the missing pulse detector 114 does not produce an output signal, even when a reproduces cue signal of 40 cycles/2.4 cm is supplied to the decade counter 106. Therefore, the AND gate 118 is not conducted, preventing an erroneous detection from being carried out. Where the output signal (having the waveform of FIG. 3G) from the monostable multivibrator 122 rises, then the monostable multivibrator 124 supplies a reset signal having the waveform of FIG. 3I to a decade counter 106.

Description is now given of the case where it is tried to detect a cue signal issued from the oscillator 30-1, that is, a cue signal of 40 cycles/2.4 cm. In this case, the AND gate 116 is selected by the switch 126. As in the aforementioned operation, the AND gate 116 is conducted only when a cue signal of 40 cycles/2.4 cm is issued from the band pass filter 74. A detection signal is delivered to the comparator 80 through the switch 126. In this case, the AND gate is not conducted even when the cue signal of 80 cycles/2.4 cm is produced from the band pass filter 74 since the timings of the output from the missing pulse detector 110 and the output from the monostable multivibrator 122 are different each other.

As described above, the above-mentioned embodiment makes it possible to detect the start of desired sound signal using plurality kinds of cue signals and detect the cue signals by the same detection circuit.

With the above-mentioned embodiments, a cue signal is recorded in the track of a sound signal in a state superposed thereon. However, the sound signal and cue signal may be recorded on different tracks. Further, it is possible to record the cue signal immediately before and after a sound signal train respectively and detect a length of time for which a sound signal train is recorded by connecting an interval between the points of time at which both cue signals are reproduced. This arrangement is particularly useful for a transcriber.

What is claimed is:

1. A magnetic recording-reproducing apparatus which comprises:
    means for driving a magnetic tape at one of a plurality of speeds during the recording or reproducing mode, and, during the fast forward or rewind mode, driving the magnetic tape at a higher speed than during the recording or reproducing mode;
    means for recording a cue signal having a lower frequency than that of a sound signal on the magnetic tape during the recording mode with the sound signal, the cue signal having a frequency proportionate to the running speed of the magnetic tape and being recorded in a length of time inversely proportionate to the running speed of the magnetic tape; and
    means for the reproducing the cue signal recorded on the magnetic tape during the fast forward or rewind mode.

2. A magnetic recording-reproducing apparatus according to claim 1, wherein said recording means includes an oscillator, a frequency divider having as many output terminals whose dividing ratios are different each other as the number of the speeds at which the magnetic tape is made to run during the recording mode, and issuing a cue signal whose frequency is proportional to the tape speed during the recording mode, a monostable multivibrator which has as many time-constant-presetting terminals which define different time constants as the number of the speeds at which the magnetic tape is made to run during the recording mode, and, during the recording mode, issues an output signal having a time width inversely proportionate to the running speed of the magnetic tape, a gate for producing a signal representing the logical sum of the cue signal issued from the frequency divider and the output signal from the monostable multivibrator, and a magnetic head for recording an output signal from the gate on the magnetic tape, and said reproducing means includes a reproduction head which acts as an erasing head during the recording mode, and, during the fast forward or rewind mode, is pressed against the magnetic tape to detect signals recorded on the magnetic tape; and a band pass filter which is connected to the reproduction head and selectively extracts the cue signal included in output signals from the reproduction head.

3. A magnetic recording-reproducing apparatus according to claim 1, wherein said recording means includes a plurality of oscillators having different oscillation frequencies, a frequency divider which is connected to the oscillator, and has as many output terminals whose dividing ratios are different from each other as the number of the speeds at which the magnetic tape is made to run during the recording mode and issues a cue signal having a frequency proportionate to the running speed of the magnetic tape during the recording mode, a monostable vibrator which has as many time constant-presetting terminals which define different time constants as the number of the speeds at which the magnetic tape is made to run, and, during the recording mode, sends forth an output signal having a time width inversely proportionate to the running speed of the magnetic tape, a gate for producing a signal representing the logical sum of the output cue signal from the frequency divider and the output signal from the monostable multivibrator, and a recording head for recording the output cue signal from the gate on the magnetic tape, and said reproducing means includes a reproduction head which acts as an erasing head during the recording mode and which is pressed against the magnetic tape during the fast forward or rewind mode, a band pass filter which selectively extracts the cue signal included in output signals from the reproduction head, a wave shaping circuit for converting the output signal from the band pass filter into a pulse signal, and a judgement circuit for counting the pulse signal from the wave shaping circuit, thereby distinguishing the cue signal issued from the predetermined oscillator.

4. A magnetic recording-reproducing apparatus according to claim 3, wherein said judgment circuit includes a counter for counting the pulse signal from the wave-shaping circuit, missing pulse detectors which are provided in the same number as said plural oscillators and send forth detection signals when output signals from said counter corresponding to the oscillation frequencies of said plural oscillators cease to be issued, a rectifying circuit for rectifying an output signal from the band pass filter, a monostable multivibrator for issuing a pulse when the output signal from the rectifying circuit falls, AND gates which are provided in the same number as said plural oscillators and of which the first input terminals are connected to the output terminals of the respective missing pluse detectors, and the second input terminals are connected to the output terminal of the monostable multivibrator, and a switch for selecting the AND gate which is connected to the output terminal of the counter corresponding to the predetermined oscillator.

* * * * *